(12) United States Patent
Graf et al.

(10) Patent No.: US 8,993,658 B2
(45) Date of Patent: Mar. 31, 2015

(54) SURFACTANT COMPOSITIONS AND USE FOR AQUEOUS COMPOSITIONS

(71) Applicant: Dow Global Technologies LLC, Midland, MI (US)

(72) Inventors: Irina V. Graf, Midland, MI (US); Arkady L. Krasovskiy, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 34 days.

(21) Appl. No.: 13/865,272

(22) Filed: Apr. 18, 2013

(65) Prior Publication Data

US 2013/0280434 A1    Oct. 24, 2013

Related U.S. Application Data

(60) Provisional application No. 61/636,780, filed on Apr. 23, 2012.

(51) Int. Cl.
| | |
|---|---|
| *C08K 3/02* | (2006.01) |
| *C08K 5/06* | (2006.01) |
| *C09D 7/12* | (2006.01) |
| *B05D 3/02* | (2006.01) |
| *C08G 65/00* | (2006.01) |
| *C08L 71/00* | (2006.01) |

(52) U.S. Cl.
CPC ............ *C09D 7/1233* (2013.01); *B05D 3/0254* (2013.01); *C09D 7/125* (2013.01); *C08G 65/00* (2013.01); *C08L 71/00* (2013.01); *C08L 2201/54* (2013.01)
USPC ............................................ 524/80; 524/375

(58) Field of Classification Search
USPC .......................................................... 524/80
See application file for complete search history.

(56) References Cited

U.S. PATENT DOCUMENTS

| | | | | |
|---|---|---|---|---|
| 4,064,309 | A | * | 12/1977 | Merger et al. .................. 428/413 |
| 4,666,523 | A | * | 5/1987 | Yokota et al. ............... 106/209.1 |
| 5,035,785 | A | | 7/1991 | Debroy et al. |
| 6,020,296 | A | | 2/2000 | Mertens et al. |
| 7,435,273 | B2 | | 10/2008 | Large et al. |
| 2003/0229171 | A1 | | 12/2003 | Zhao et al. |
| 2009/0004394 | A1 | | 1/2009 | Koller et al. |
| 2009/0005287 | A1 | | 1/2009 | Boutique et al. |

FOREIGN PATENT DOCUMENTS

| | | |
|---|---|---|
| CN | 102146159 | 8/2011 |
| EP | 1331217 B1 | 8/2006 |
| JP | 2000-033255 A | 2/2000 |
| JP | 2010-222501 A | 10/2010 |
| WO | 2007/117512 A1 | 10/2007 |
| WO | 2009/023171 A1 | 2/2009 |
| WO | 2009/091592 A1 | 7/2009 |
| WO | 2010/082918 A1 | 7/2010 |
| WO | 2010/131217 A2 | 11/2010 |
| WO | 2010/136926 A2 | 12/2010 |
| WO | 2013059765 A1 | 4/2013 |

OTHER PUBLICATIONS

European Search Report issued in EP 13 16 0722 dated Jul. 15, 2013.

* cited by examiner

*Primary Examiner* — Hui Chin
(74) *Attorney, Agent, or Firm* — Karl E. Stauss; Ronald D. Bakule

(57) ABSTRACT

A surfactant composition selected from the group consisting of: ArO—$(CH_2CH[CH_2CH_3]O)_{1-10}(CH_2CH_2O)_{5-50}H$, isomers, aromatic ring substituted analogs, and mixtures thereof; and an aqueous coating composition including an aqueous polymeric dispersion, and certain other compositions, including the surfactant composition are provided. Also provided are a method for forming a coating and a method for improving the freeze/thaw stability of an aqueous composition including an aqueous polymeric dispersion.

6 Claims, No Drawings

SURFACTANT COMPOSITIONS AND USE FOR AQUEOUS COMPOSITIONS

This invention relates to surfactants for aqueous compositions. This invention particularly relates to a surfactant composition selected from the group consisting of: ArO—$(CH_2CH[CH_2CH_3]O)_{1-10}(CH_2CH_2O)_{5-50}H$, isomers, aromatic ring substituted analogues, and mixtures thereof. The invention also relates to an aqueous coating composition including an aqueous polymeric dispersion and from 0.1% to 40% by weight, based on the weight of aqueous polymeric dispersion solids, of the surfactant composition, a method for forming a dry coating, and a method for improving the freeze/thaw stability of an aqueous composition.

Surfactants are typically added to compositions such as, for example, emulsion polymers and waterborne paints or coatings that include aqueous dispersions of polymers to function as emulsifiers, pigment dispersants, open time additives, and as freeze/thaw additives. The ArO—$(CH_2CH[CH_2CH_3]O)_{1-10}(CH_2CH_2O)_{5-50}H$ surfactants are, importantly, non-alkylphenol ethoxylates (APEO) and are potentially zero-VOC materials.

Volatile organic compound (VOC) emissions contribute to the creation of ozone, a main constituent of smog. In the US, VOC regulations established by the US Environmental Protection Agency (EPA) and enforced at the state level dictate the maximum concentration of volatile solvents in paints, clean up solvents, and other products. In Europe, VOC limits are defined by the 2004/42/EC Solvents Directive for Decorative Paints. VOC regulations and prohibitions against the use of APEO materials have become more and more stringent and have affected the use of available surfactants.

The present invention serves to provide low or zero VOC compositions including ArO—$(CH_2CH[CH_2CH_3]O)_{1-10}(CH_2CH_2O)_{5-50}H$ surfactants that are suitable for use in numerous compositions, particularly in compositions that include aqueous polymeric dispersions such as, for example, decorative and protective coatings for various substrates.

U.S. Pat. No. 6,020,296 discloses an all purpose liquid cleaning composition including a condensation product of ethylene oxide, butylene oxide and a $C_6$-$C_{16}$ fatty alcohol. There continues to be a need for low and no VOC compositions for other uses including for aqueous polymeric dispersions and compositions that include them.

In a first aspect of the present invention there is provided a surfactant composition selected from the group consisting of; ArO—$(CH_2CH[CH_2CH_3]O)_{1-10}(CH_2CH_2O)_{5-50}H$, isomers, aromatic ring substituted analogues, and mixtures thereof.

In a second aspect of the present invention there is provided an aqueous coating composition comprising an emulsion polymer and from 0.1% to 40% by weight, based on the weight of emulsion polymer solids, said surfactant composition of the first aspect of the present invention.

In a third aspect of the present invention there is provided a method for forming a coating comprising (a) forming said aqueous coating composition of the second aspect of the present invention; (b) applying said aqueous coating composition to a substrate; and (c) drying, or allowing to dry, said applied aqueous coating composition.

In a fourth aspect of the present invention there is provided a method for improving the freeze/thaw stability of an aqueous composition comprising an aqueous polymeric dispersion by adding from 0.1% to 40% by weight, based on the weight of said aqueous polymeric dispersion solids, surfactant selected from the group consisting of ArO—$(CH_2CH[CH_2CH_3]O)_{1-10}(CH_2CH_2O)_{5-50}H$, isomers, aromatic ring substituted analogues, and mixtures thereof.

In a fifth aspect of the present invention there is provided a composition comprising from 0.1% to 40% by weight, based on the weight of said composition, surfactant selected from the group consisting of ArO—$(CH_2CH[CH_2CH_3]O)_{1-10}(CH_2CH_2O)_{5-50}H$, isomers, aromatic ring substituted analogues, and mixtures thereof; said composition being selected from the group consisting of metal working fluids, agricultural formulations, oil and gas recovery formulations, detergents, and emulsifiers.

The present invention relates to a surfactant composition selected from the group consisting of; ArO—$(CH_2CH[CH_2CH_3]O)_{1-10}(CH_2CH_2O)_{5-50}H$, isomers, aromatic ring substituted analogues, and mixtures thereof. By "ArO—$(CH_2CH[CH_2CH_3]O)_{1-10}(CH_2CH_2O)_{5-50}H$ surfactant" herein is meant "ArO—$(CH_2CH[CH_2CH_3]O)_{1-10}(CH_2CH_2O)_{5-50}H$, isomers, aromatic ring substituted analogues, and mixtures thereof". By "Ar" herein is meant an aromatic ring. By "ArO—$(CH_2CH[CH_2CH_3]O)_{1-10}(CH_2CH_2O)_{5-50}H$" herein is meant a butoxylate—ethoxylate of a phenol, the product being a phenoxy butoxylate-ethoxylate. It is anticipated that the reaction of a phenol with butylenes oxide normally leads to the mixture of regioisomeric products formed via the nonselective opening of butylenes oxide from more or less hindered sites. It is also anticipated that the ratio of regioisomers may vary greatly depending on the catalyst/solvent/conditions used, and may even lead to selective formation of one particular regioisomer. All possible mixtures of regioisomeric products, as well as regioisomerically pure materials, resulting from the ring opening of butylenes oxide are included in "ArO—$(CH_2CH[CH_2CH_3]O)_{1-10}(CH_2CH_2O)_{5-50}H$, isomers, aromatic ring substituted analogues, and mixtures thereof" herein. By "aromatic ring substituted analogues" herein is meant that the phenoxy ring may bear none or one or more substituents. Preferred substituents are any linear or branched $C_1$-$C_6$ alkyl-; aromatic-; hydroxy, alkoxy- or aryloxy-; and halogen groups. More preferred substituents are any linear or branched $C_1$-$C_6$ alkyl-, phenyl-, hydroxyl, alkoxy-, and chloro- or fluoro-groups. Preferred precursors of the phenoxy group are substituted or unsubstituted phenol, resorcinol, catechol, phenylphenol, and hydroquinone. More preferred are cresol and phenylphenol.

Selected phenol compositions are subjected to an alkoxylation reaction to provide the ArO—$(CH_2CH[CH_2CH_3]O)_{1-10}(CH_2CH_2O)_{5-50}H$, preferably ArO—$(CH_2CH[CH_2CH_3]O)_{1-4}(CH_2CH_2)_{12-20}H$, isomers, aromatic ring substituted analogues, and mixtures thereof. A catalyst is typically used in the reaction of the phenol with butylene oxide. Typical catalysts are KH, KOH, NaOH, DMC, BF3, Al(OTf)3, Bi(OTf)3, tertiary amines, any mineral acid, and solid supported acids. Preferred are KOH, KH, DMC, and sulfuric acid. The alkoxylation reaction may be conducted in or without solvent. The solvent can be any solvent known to be used in alkoxylation reactions. It is preferable if the solvent can solubilize the phenol. Examples of solvents include dimethoxyethane and toluene. The butoxylation and ethoxylation steps can be conducted in one pot with or without adding additional catalyst or the butoxylated product may be isolated and ethoxylated using the same or a different catalyst.

The ArO—$(CH_2CH[CH_2CH_3]O)_{1-10}(CH_2CH_2O)_{5-50}H$ surfactants are desirably less than 10% volatile by Method 24, preferably less than 5% volatile, and most preferably less than 1% volatile to be useful in low VOC aqueous coating compositions in the U.S. To be classified as VOC-exempt in the EU, the surfactants must boil above 250° C. and preferably above 280° C.

The aqueous coating composition of the present invention includes from 0.1% to 40%, preferably from 0.1% to 30%, and more preferably from 0.5% to 20%, by weight based on the weight of the aqueous polymeric dispersion solids, ArO—$(CH_2CH[CH_2CH_3]O)_{1-10}(CH_2CH_2O)_{5-50}H$ surfactant.

The aqueous coating composition of the present invention includes an aqueous polymeric dispersion and from 0.1% to 40% by weight, based on the weight of aqueous polymeric dispersion solids, of the surfactant of the present invention. Typically, the calculated Tg of the aqueous polymeric dispersion is from −25° C. to 110° C. "Calculated Tg" of the polymers herein are those calculated using the Fox equation (T. G. Fox, *Bull. Am. Physics Soc.*, Volume 1, Issue No. 3, p. 123 (1956)). That is, for example, for calculating the Tg of a copolymer of monomers M1 and M2, $$1/Tg(\text{calc.}) = w(M1)/Tg(M1) + w(M2)/Tg(M2)$$

, wherein
Tg(calc.) is the glass transition temperature calculated for the copolymer
w(M1) is the weight fraction of monomer M1 in the copolymer
w(M2) is the weight fraction of monomer M2 in the copolymer
Tg(M1) is the glass transition temperature of the homopolymer of M1
Tg(M2) is the glass transition temperature of the homopolymer of M2,
all temperatures being in ° K.

The glass transition temperature of homopolymers may be found, for example, in "Polymer Handbook", edited by J. Brandrup and E. H. Immergut, Interscience Publishers.

The aqueous polymeric dispersion may be a dispersion of a polymer, oligomer, or prepolymer in an aqueous medium. In some embodiments the aqueous polymeric dispersion may be reactive before, during, or subsequent to film formation. By "aqueous medium" is meant herein a medium including at least 50%, by weight based on the weight of the medium, water. Typical aqueous polymeric dispersions are aqueous dispersions of epoxies, urethanes, acrylic polyols, polyesters, and hybrids and mixtures of these and other chemistries; and addition polymerized emulsion polymers. The emulsion polymer typically includes at least one addition copolymerized ethylenically unsaturated monomer such as, for example, styrene or substituted styrenes; vinyl toluene; butadiene; (meth)acrylonitrile; a (meth)acrylic ester monomer such as, for example, methyl(meth)acrylate, ethyl(meth)acrylate, butyl(meth)acrylate, hydroxyethyl(meth)acrylate, hydroxypropyl(meth)acrylate, and ureido-functional (meth)acrylates; vinyl acetate or other vinyl esters; vinyl monomers such as vinyl chloride, vinylidene chloride, and N-vinyl pyrrolidone. The use of the term "(meth)" followed by another term such as (meth)acrylate, as used throughout the disclosure, refers to both acrylates and methacrylates.

In certain embodiments the emulsion polymer includes from 0% to 6%, or in the alternative, from 0% to 3 wt % or from 0% to 1%, by weight based on the weight of the polymer, of a copolymerized multi-ethylenically unsaturated monomer. It is important to select the level of multi-ethylenically unsaturated monomer so as to not materially interfere with film formation and integrity. Multi-ethylenically unsaturated monomers include, for example, allyl(meth)acrylate, diallyl phthalate, 1,4-butylene glycol di(meth)acrylate, 1,2-ethylene glycol di(meth)acrylate, 1,6-hexanediol di(meth)acrylate, and divinyl benzene.

The emulsion polymer includes from 0% to 15%, preferably from 0.5% to 5%, of a copolymerized monoethylenically-unsaturated acid monomer, based on the weight of the polymer. Acid monomers include carboxylic acid monomers such as, for example, (meth)acrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl(meth)acrylate, phosphoalkyl(meth)acrylates such as phosphoethyl(meth)acrylate, phosphopropyl(meth)acrylate, and phosphobutyl(meth)acrylate, phosphoalkyl crotonates, phosphoalkyl maleates, phosphoalkyl fumarates, phosphodialkyl(meth)acrylates, phosphodialkyl crotonates, and allyl phosphate.

The aqueous emulsion polymer is typically formed by an addition polymerization emulsion polymerization process as is well known in the art. Conventional surfactants and blends may be used including, for example, anionic and/or nonionic emulsifiers such as, for example, alkali metal or ammonium alkyl sulfates, alkyl sulfonic acids, fatty acids, and oxyethylated alkyl phenols, and mixtures thereof. Polymerizable surfactants that include at least one ethylenically unsaturated carbon-carbon bond which can undergo free radical addition polymerization may be used. The amount of surfactant used is usually 0.1% to 6% by weight, based on the weight of total monomer. Either thermal or redox initiation processes may be used. Conventional free radical initiators may be used such as, for example, hydrogen peroxide, t-butyl hydroperoxide, t-amyl hydroperoxide, ammonium and/or alkali persulfates, typically at a level of 0.01% to 3.0% by weight, based on the weight of total monomer. Redox systems using the same initiators coupled with a suitable reductant such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal. Chain transfer agents such as mercaptans may be used to lower the molecular weight of the polymer. The monomer mixture may be added neat or as an emulsion in water. The monomer mixture may be added in a single addition or more additions or continuously over the reaction period using a uniform or varying composition. Additional ingredients such as, for example, free radical initiators, oxidants, reducing agents, chain transfer agents, neutralizers, surfactants, and dispersants may be added prior to, during, or subsequent to the monomer addition. Processes yielding polymodal particle size distributions such as those disclosed in U.S. Pat. Nos. 4,384,056 and 4,539,361, for example, may be employed. The emulsion polymer may be formed in a multi-stage emulsion polymerization process as are well known in the art. The emulsion polymer is also contemplated to be formed in two or more stages, the stages differing in molecular weight. Blending two different emulsion polymers is also contemplated.

The average particle diameter of the emulsion polymer particles is typically from 40 nm to 1000 nm, preferably from 40 nm to 350 nm. Particle diameters herein are those measured by dynamic light scattering on a Brookhaven BI-90 Plus particle size analyzer.

The aqueous coating composition of the invention is prepared by techniques which are well known in the coatings art. The ArO—$(CH_2CH[CH_2CH_3]O)_{1-10}(CH_2CH_2O)_{5-50}H$ surfactants can be added to the coating composition at multiple points during the binder synthesis and formulation process. This includes before emulsion polymerization, during emulsion polymerization, after emulsion polymerization, to the pigment grind, during the coating formulation, or to the fully formulated coating composition.

First, pigment(s), if any, are well dispersed in an aqueous medium under high shear such as is afforded by a COWLES™ mixer or predispersed colorant(s), or mixtures thereof are used. Then the emulsion polymer is added under low shear stirring along with the coalescent composition and other coatings adjuvants as desired. The aqueous coating composition may include, in addition to the aqueous polymeric dispersion and optional pigment(s), conventional coatings adjuvants such as, for example, extenders, emulsifiers, coalescing agents other than the coalescent composition of the present invention, plasticizers, antifreezes, curing agents, buffers, neutralizers, thickeners, rheology modifiers, humectants, wetting agents, biocides, plasticizers, antifoaming agents, UV absorbers, fluorescent brighteners, light or heat stabilizers, biocides, chelating agents, dispersants, colorants, waxes, and water-repellants.

Examples of suitable pigments and extenders include titanium dioxide such as anatase and rutile titanium dioxides; zinc oxide; antimony oxide; iron oxide; magnesium silicate; calcium carbonate; organic and inorganic colored pigments; aluminosilicates; silica; various clays such as kaolin and delaminated clay; and lead oxide. It is also contemplated that the aqueous coating composition may also contain opaque polymer particles, such as, for example, Ropaque™ Opaque Polymers (The Dow Chemical Co.).

The amounts of pigment and extender in the aqueous coating composition vary from a pigment volume concentration (PVC) of 0 to 85 and thereby encompass coatings otherwise described in the art, for example, as clear coatings, stains, flat coatings, satin coatings, semi-gloss coatings, gloss coatings, primers, textured coatings, and the like. The aqueous coating composition herein expressly includes architectural, maintenance, and industrial coatings, caulks, sealants, and adhesives. The pigment volume concentration is calculated by the following formula:

$$PVC\ (\%) = \frac{\text{volume of pigment(s), + volume extender(s)} \times 100}{\text{total dry volume of paint}}.$$

The solids content of the aqueous coating composition may be from 10% to 70% by volume. The viscosity of the aqueous coating composition may be from 50 centipoises to 50,000 centipoises, as measured using a Brookfield viscometer; viscosities appropriate for different application methods vary considerably.

In the method for forming a coating of the invention the aqueous coating composition is typically applied to a substrate such as, for example, wood, metal, plastics, marine and civil engineering substrates, cementitious substrates such as, for example, concrete, stucco, and mortar, previously painted or primed surfaces, and weathered surfaces. The aqueous coating composition may be applied to a substrate using conventional coatings application methods such as, for example, brush, roller, caulking applicator, roll coating, gravure roll, curtain coater and spraying methods such as, for example, air-atomized spray, air-assisted spray, airless spray, high volume low pressure spray, and air-assisted airless spray. The aqueous coating composition herein expressly includes compositions commonly known as architectural, maintenance, and industrial coatings, caulks, sealants, and adhesives.

Drying of the aqueous coating composition to provide a coating may be allowed to proceed under ambient conditions such as, for example, at 5° C. to 35° C. or the coating may be dried at elevated temperatures such as, for example, from 35° C. to 150° C.

In the method for improving the freeze/thaw stability of an aqueous composition including an aqueous polymeric dispersion of the present invention from 0.1% to 40%, preferably from 0.2% to 20%, and more preferably from 0.3% to 5%. by weight, based on the weight of the aqueous polymeric dispersion solids, $ArO-(CH_2CH[CH_2CH_3]O)_{1-10}(CH_2CH_2O)_{5-50}H$ surfactant is added. It is contemplated that that the $ArO-(CH_2CH[CH_2CH_3]O)_{1-10}(CH_2CH_2O)_{5-50}H$ surfactant may be added, all or in part, separately, in a mixture with other coatings adjuvants, or as a surfactant for the aqueous polymeric dispersion.

The invention in some of its embodiments will now be further described by reference to the following examples:

EXAMPLE 1

Formation of surfactant

Phenol (1.0 mmol), butylene oxide (2.0 mmol), KH (1-2 mg, 1-2 wt. %) were loaded into a glass PPR vial (insert). Alkoxylation was carried out in a Symyx PPR® (Parallel Pressure Reactor) setup containing 48 reactors. Ethylene oxide (EO) was delivered via an Isco syringe pump equipped with a robotically-controlled needle and compressed gas microvalve connected to the PPR, such that required equivalents of EO were added per molecule of alcohol initiator. A glass insert along with a removable PEEK stir paddle for the cell were dried in a vacuum oven at 125° C. overnight. The insert was loaded into each PPR well, pressurized with nitrogen to 50 psi, and heated at 150° C. for 12 hours. Ethylene oxide (20 mmol) was introduced at 150° C. and the reaction was stirred for 3 h at that temperature. The resulting viscous surfactants were tested for their properties without additional purification.

EXAMPLE 2

Surfactant Characterization

Selected surfactants synthesized as described in Example 1 were characterized for surfactant properties such as dynamic surface tension, substrate wetting (contact angle) and foaming properties. Properties were determined for 0.1 wt % aqueous surfactant solutions at ambient temperature.

Dynamic surface tension was measured using a Hamilton Microstar formulator. During the test, air was dispensed into the vial containing the surfactant solution at a predetermined rate through disposable tips (radius: 0.223 mm), and the instrument recorded pressure changes. From the pressure data collected, bubble rate and maximum pressure values were determined, and dynamic surface tension was then estimated.

The foam test was conducted at ambient temperature using a high-throughput-enabled Phase Characterization and Identification Apparatus (PICA II). Vials were shaken and foam images were collected via a camera. During the test, 1 ml vial containing 0.5 ml of surfactant solution was shaken using the wrist shaker on level #4 for 20 seconds. For each vial, images were collected via a camera: prior to shaking, immediately after shaking. The images were analyzed to determine ratio of the height of the foam layer to the liquid height.

Contact angle measurements were performed at ambient temperature utilizing a VCA Optima XE (AST Products, Inc.) instrument and corresponding software. The contact angle measurements were performed on a static sessile (i.e. sitting) drop. Five drops of surfactant solution were tested. For each drop, 1 µL of surfactant solution was deposited on the substrate using the syringe in the syringe assembly, an image of the drop on the substrate was recorded immediately after drop placement, and the left and right contact angles were calculated. The final contact angle reported was the average of the left and right contact angles for five drops. Teflon™ and polyethylene surfaces were used as substrates. Teflon™ tape was carefully placed on a glass microscope slide, using a small amount of adhesive on each edge of the microscope slide to hold the Teflon tape on the surface. Clear Filmgard polyethylene films (product #CK410), 4 mil (101.6 um) thick, were cut into 25 mm×75 mm strips, and used as is.

The average degrees of butoxylation and ethoxylation herein were calculated based on $H^1$NMR spectra analysis by calculating the relative integral ratios between protons in the aromatic region (6.95-7.60 ppm), alpha-Oxygen protons of $CH_2$ and CH groups (3.55-4.15 ppm), and $CH_3$ groups (0.85-1.00 ppm).

Testing results are summarized in Table 2.1 and compared to values obtained for a commercial additive based on ethoxylated tristyryl phenol Rhodoline™ FT-100 (Rhodia Co.) and multifunctional additive for coatings Triton™ X-100 (The Dow Chemical Co.).

Several surfactants of the invention showed surface tension reduction at 2 and 6 bubbles/sec superior to that of Rhodoline™ FT-100, medium substrate wetting, and foaming lower than that of Triton™ X-100 benchmark.

EXAMPLE 3

Freeze-Thaw Stability of Acrylic Paint

Several selected ArO—$(CH_2CH[CH_2CH_3]O)_{1-10}$ $(CH_2CH_2O)_{5-50}$ surfactants synthesized as described in Example 1 were tested as freeze-thaw additives in the acrylic paints including Rhoplex™AC-464 or Rhoplex™ VSR-2015, and stability of the paints was compared to paints containing Rhodoline™ FT-100 as freeze-thaw additive, and paint without any freeze-thaw additive (prepaint). The following protocol was used. For 1 wt % additive concentration, 0.060 g of freeze-thaw additive, 0.24 g of water, and 6.8 g of Rhoplex™VR-2015 (or 6.4 g of Rhoplex™AC-464) were combined in a glass vial. In case of no additive, 0.3 g of water was added to prepaint. For 0.5 wt % additive concentration, 0.030 g of freeze-thaw additive, 0.27 g of water, and 6.8 g of Rhoplex™ VR-2015 (or 6.4 g of Rhoplex™AC-464) were combined in a glass vial. The vial was mixed for 4 minutes at 750 rpm using an overhead mixer with Cowles blade impeller. The paint formulation was stored for 24 hours. The initial formulation viscosity was measured using high throughput method TADM. The vials were placed in a freezer at 0(+−1.5)° C. for 12 hours. The vials were then taken out of the freezer and kept at ambient temperature for 24 hours. The samples were evaluated for failure visually and viscosity was evaluated using TADM.

TABLE 2.1

Surfactant properties of selected BO-EO adducts, Rhodoline ™ FT-100, and Triton ™ X-100.

| Initiator Alcohol used for Surfactant | Number of BO units | Number of EO units | Dynamic Surface Tension at 2 bubbles/sec, dyne/cm | Dynamic Surface Tension at 6 bubbles/sec, dyne/cm | Contact Angle on Teflon, deg | Contact Angle on polyethylene, deg | Foam/liquid ratio@ 0 min |
|---|---|---|---|---|---|---|---|
| cresol | 2.7 | 6.8 | 39 | 45 | 76 | 67 | 0.21 |
| cresol | 2.7 | 14.0 | 44 | 51 | 85 | 65 | 0.45 |
| cresol | 3.0 | 19.0 | 45 | 52 | 82 | 66 | 0.49 |
| cresol | 3.9 | 13.1 | 41 | 47 | 73 | 53 | 0.49 |
| cresol | 4.3 | 17.7 | 40 | 46 | 74 | 54 | 0.46 |
| cresol | 4.4 | 20.75 | 44 | 51 | 77 | 62 | 0.46 |
| cresol | 5.2 | 15.0 | 39 | 45 | 73 | 54 | 0.42 |
| cresol | 6.2 | 21.7 | 37 | 44 | 73 | 56 | 0.56 |
| 2-phenylphenol | 1.9 | 15.3 | 45 | 52 | 82 | 46 | 0.45 |
| 2-phenylphenol | 1.9 | 20.5 | 45 | 52 | 74 | 58 | 0.47 |
| 2-phenylphenol | 2.8 | 13.2 | 41 | 47 | 73 | 62 | 0.45 |
| 2-phenylphenol | 2.9 | 20.9 | 46 | 52 | 74 | 62 | 0.52 |
| 2-phenylphenol | 3.9 | 13.9 | 43 | 54 | 76 | 55 | 0.47 |
| 2-phenylphenol | 4.0 | 19.8 | 43 | 53 | 76 | 55 | 0.47 |
| Rhodoline ™ FT-100 | 0 | 8.5 | 62 | 70 | 84 | NA | 0.24 |
| Triton ™ X-100 | 0 | 9.5 | 35 | 44 | 64 | 54 | 0.68 |

TABLE 3.1

Freeze-thaw performance of selected BO-EO adducts.

| Product | # BO units | # EO units | Viscosity after 3 FT Cycles, cPs @ 10 lb/100 gal | | Viscosity after 1 FT Cycle, cPs @ 5 lb/100 gal | |
|---|---|---|---|---|---|---|
| | | | AC-464 | VSR-2015 | AC-464 | VSR-2015 |
| cresol | 2.7 | 14.0 | 1870 | 2668 | <1500 | 7645 |
| cresol | 2.7 | 19.0 | 1621 | 2619 | 2054 | 2982 |
| cresol | 3.9 | 13.1 | 1794 | 2605 | 1652 | 2348 |
| cresol | 4.3 | 17.7 | 1537 | 3157 | 1674 | 3469 |
| cresol | 4.4 | 20.75 | 1839 | 2812 | 2378 | 3551 |
| cresol | 5.2 | 15.0 | 2030 | 2825 | 1725 | 2385 |
| cresol | 6.2 | 21.7 | 1202 | 2770 | 1767 | 3745 |
| 2-phenylphenol | 1.9 | 15.3 | 1412 | 1768 | 2323 | 2659 |
| 2-phenylphenol | 1.9 | 20.5 | 1572 | 2618 | 1635 | 2024 |
| 2-phenylphenol | 2.8 | 13.2 | 1487 | 7906 | 1719 | 1826 |
| 2-phenylphenol | 2.9 | 20.9 | 1371 | 2195 | 1782 | 1563 |
| 2-phenylphenol | 3.9 | 13.9 | 1426 | 1825 | 1755 | 2245 |
| 2-phenylphenol | 4.0 | 19.8 | 2110 | 2629 | <1500 | 1998 |
| resorcinol | 6.2 | 17.3 | 2709 | 5368 | Not tested | Not tested |
| Rhodoline™ FT-100. | 0 | 8.5 | 1440 | 1617 | <1500 | 1716 |

Evaluation of selected ArO—(CH$_2$CH[CH$_2$CH$_3$]O)$_{1-10}$(CH$_2$CH$_2$O)$_{5-50}$H surfactants of the invention as freeze-thaw additives in the acrylic paints including Rhoplex™AC-464 and Rhoplex™VSR-2015 showed that at 1% concentration (10 lb/100 gal), the tested materials provided freeze-thaw stability to both paints after three freeze-thaw cycles, with final paint viscosity similar to that of the paint containing commercial product Rhodoline™ FT-100 (Table 2). At 0.5% concentration (5 lb/100 gal), the tested materials provided freeze-thaw stability to both paints after one freeze-thaw cycle, with final paint viscosity similar to that of the paint containing commercial product Rhodoline™ FT-100.

What is claimed is:

1. A surfactant composition selected from the group consisting of:
    ArO—(CH$_2$CH[CH$_2$CH$_3$]O)$_{1-10}$(CH$_2$CH$_2$O)$_{5-50}$H, isomers, aromatic ring substituted analogues wherein substituents are selected from the group consisting of linear or branched C$_1$-C$_6$ alkyl-, phenyl, hydroxyl, alkoxy-, and chloro- or fluoro-groups, and mixtures thereof.

2. An aqueous coating composition comprising an aqueous polymeric dispersion and from 0.1% to 40% by weight, based on the weight of said polymeric dispersion solids, said surfactant composition of claim 1.

3. The aqueous coating composition of claim 2 wherein said aqueous polymeric dispersion is selected from the group consisting of aqueous dispersions of epoxies, urethanes, acrylic polyols, polyesters, and hybrids and mixtures of these; and addition polymerized emulsion polymers.

4. A method for forming a coating comprising
    (a) forming said aqueous coating composition of claim 2 or claim 3;
    (b) applying said aqueous coating composition to a substrate; and
    (c) drying, or allowing to dry, said applied aqueous coating composition.

5. A method for improving the freeze/thaw stability of an aqueous composition comprising an aqueous polymeric dispersion by adding from 0.1% to 40% by weight, based on the weight of said polymeric dispersion solids, ArO—(CH$_2$CH[CH$_2$CH$_3$]O)$_{1-10}$(CH$_2$CH$_2$O)$_{5-50}$H, isomers, aromatic ring substituted analogues wherein substituents are selected from the group consisting of linear or branched C$_1$-C$_6$ alkyl-, phenyl-, hydroxyl, alkoxy-, and chloro- or fluoro-groups, and mixtures thereof.

6. A composition comprising from 0.1% to 40% by weight, based on the weight of said composition, a surfactant selected from the group consisting of ArO—(CH$_2$CH[CH$_2$CH$_3$]O)$_{1-10}$(CH$_2$CH$_2$O)$_{5-50}$H, isomers, aromatic ring substituted analogues wherein substituents are selected from the group consisting of linear or branched C$_1$-C$_6$ alkyl-, phenyl-, hydroxyl, alkoxy-, and chloro- or fluoro-groups, and mixtures thereof; said composition being selected from the group consisting of metal working fluids, agricultural formulations, oil and gas recovery formulations, detergents, and emulsifiers.

* * * * *